(12) United States Patent
Victoria et al.

(10) Patent No.: US 6,379,277 B1
(45) Date of Patent: Apr. 30, 2002

(54) LIMITED SLIP DIFFERENTIAL MECHANISM FOR AN AUTOMOTIVE VEHICLE AND METHOD FOR MAKING THE SAME

(75) Inventors: Alfred Balacan Victoria, Nashville, TN (US); Joseph A. Szuba, Dearborn; Kenneth Paul Lewis, West Bloomfield, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,776

(22) Filed: Oct. 18, 2001

(51) Int. Cl.[7] ............................................. F16H 48/06
(52) U.S. Cl. ..................................... 475/231; 74/606 R
(58) Field of Search ........................ 74/606 R; 475/230, 475/231

(56) References Cited

U.S. PATENT DOCUMENTS

| | | |
|---|---|---|
| 2,463,883 A | 3/1949 | Kinsey et al. |
| 3,958,389 A | 5/1976 | Whiteside et al. |
| 4,843,917 A | 7/1989 | Van Selous et al. |
| 4,945,782 A | 8/1990 | Farrell |
| 5,715,918 A | 2/1998 | Everett et al. |
| 6,045,479 A | 4/2000 | Victoria et al. |
| 6,061,907 A | 5/2000 | Victoria et al. |
| 6,176,152 B1 | 1/2001 | Victoria et al . |

*Primary Examiner*—Dirk Wright
(74) *Attorney, Agent, or Firm*—Frank McKenzie

(57) ABSTRACT

A limited slip differential assembly 100. The differential assembly 100 includes first and second housing portions 104, 106 which are formed by use of a flow-forming or spin-forming process and which respectively include an integrally formed splined inner surface 154, 156. The integrally formed splined inner surfaces 154, 156 are used to mate with clutch plates 146 which cooperate with clutch plates 144 to form clutch packs 150, 152. The novel splined engagement of clutch plates 146 and surfaces 154 and 156 provide improved durability, stiffness and torque capacity relative to prior designs.

19 Claims, 10 Drawing Sheets

LIMITED SLIP DIFFERENTIAL MECHANISM FOR AN AUTOMOTIVE VEHICLE AND METHOD FOR MAKING THE SAME

BACKGROUND OF THE INVENTION (1) Field of Invention

The present invention relates to a limited slip differential mechanism for an automotive vehicle and a method for making the same, and more particularly, to a method of developing a limited slip differential having a side gear clutch pack by use of a cold forming process.

(2) Background of the Invention

Automotive vehicles include differential assemblies to transmit torque from a transmission output shaft to axle shafts, which allow the right and left driven wheels of the vehicle to rotate at different speeds. One type of differential assembly or mechanism is commonly referred to as a bevel gear differential, and is one of the most frequently used differentials due to its relatively simple and effective design.

Bevel gear differentials typically include two or four pinion gears, depending upon the weight of the vehicle and the magnitude of torque transmitted by the powertrain. The pinions, are supported together with two side bevel gears in a differential housing, which is formed as a one piece iron casting. Some differentials, commonly referred to as limited slip differentials, further include side gear clutch packs, which are disposed within the differential and which are designed to improve the performance of the differential. Particularly, the clutch packs allow the differentials to provide more driving force to a wheel with traction if the opposing wheel loses traction or begins to spin. In this manner, limited slip differentials are used within sports cars for increased traction while cornering and within off-road vehicles where the drive wheels often lose traction.

The clutch plates within these prior limited slip differentials are retained to the differential housing by use of two integrally formed tabs or "ears" that mate with the inner surface of the differential housing pocket. The differential housing is typically constructed from a cast iron metal, and the pocket that houses the ears is machined for accuracy or is left "as-cast", and does not retain its dimensional characteristic after extended use. Over time, backlash may result, creating the possibility of noise and reduced performance. Additionally, the clutch packs are limited in size due to the housing wall thickness required by the casting process and the stiffness requirements of the housing. These size constraints undesirably limit the torque capacity of the clutch packs.

Another drawback related to these prior cast differentials is that they have significantly lower ductility and yield strength relative to most steel. Thus, the cast differential housings must typically be formed with relatively thick walls to provide supplemental strength. The greater thickness of the walls produces increased weight and increased inertia that reduces powertrain efficiencies. Also, the cast iron properties of the housing require the outer ring or bevel gear of the differential to be mounted on with several bolts, thereby increasing machining and assembly costs. Furthermore, due to limitations of the machining process and the assembly of the gears within the prior differentials, one-piece cast housings are typically only limited to two pinion gear designs which limits torque capacity.

The manufacturing and machining of these one-piece cast housings further provides additional drawbacks. For example and without limitation, iron castings require offsets to compensate for shrinkage, and thus, many turning or milling operations are necessary to achieve dimensional accuracy during machining. Also, assembly of these prior differentials can typically only be performed manually due to the number of different joining axes. The required machining processes further cause excessive tool wear, and require expensive and space-intensive transfer lines with low flexibility.

There is therefore a need for a new limited slip differential mechanism and a method of manufacturing the same, which utilizes a cold forming process, and which provides for improved performance, a modular design, reduced weight and size, and decreased manufacturing cost and complexity.

SUMMARY OF THE INVENTION

A first non-limiting advantage of the present invention is that it provides a limited slip differential mechanism which is made by use of a cold forming process and which overcomes the drawbacks of prior systems.

A second non-limiting advantage of the present invention is that it provides a method for forming a housing for a limited slip differential which has a reduced wall thickness, thereby allowing for a larger clutch pack and/or a clutch pack with fewer plates to be utilized within the housing.

A third non-limiting advantage of the present invention is that it simplifies and reduces the cost of the differential assembly, relative to prior differential assemblies, by simplifying the manufacturing process and by eliminating pinion retaining bolts, snap rings, and other components.

A fourth non-limiting advantage of the present invention is that it provides an enclosed transfer case design with improved stiffness relative to prior cast designs, and an enclosed pinion which eliminates the need for clips and lock screws.

A fifth non-limiting advantage of the present invention is that it allows for automated assembly, thereby simplifying the assembly procedure and reducing cost.

A sixth non-limiting advantage of the present invention is that it reduces material cost and eases manufacturing by using chipless forming operations.

A seventh non-limiting advantage of the present invention is that it allows for an encapsulated pinion shaft, and further allows for use of two, three, or four pinion gear combinations for improved torque capacity.

According to a first aspect of the present invention, a limited slip differential assembly is provided. The assembly includes a first housing portion having a first splined inner surface; a second housing portion having a second splined inner surface, the second housing portion being coupled to the first housing portion and cooperating with the first housing portion to form a cavity; a differential mechanism disposed within the cavity and including a pinion shaft, pinions which are coupled to the pinion shaft, a first gear member in meshing engagement with a first of the pinions, and a second gear member in meshing engagement with a second of the pinions; a first side clutch pack including a plurality of first clutch plates having a first splined outer surface which is coupled to the first splined inner surface, and a plurality of second clutch plates which are coupled to the first gear member; and a second side clutch pack including a plurality of third clutch plates having a second splined outer surface which is coupled to the second splined inner surface, and a plurality of fourth clutch plates which are coupled to the second gear member.

According to a second aspect of the present invention, a method is provided for forming a housing for a limited slip differential mechanism. The method includes the steps of forming a first housing portion having a first splined inner surface; and forming a second housing portion having a second splined inner surface, the first and second splined inner surfaces being effective to respectively mate with and operatively retain a plurality of first and second clutch plates.

These and other objects, aspects, features, and advantages of the present invention will become apparent from a consideration of the following specification and the attached drawings.

DETAILED DESCRIPTION

Figure 1:
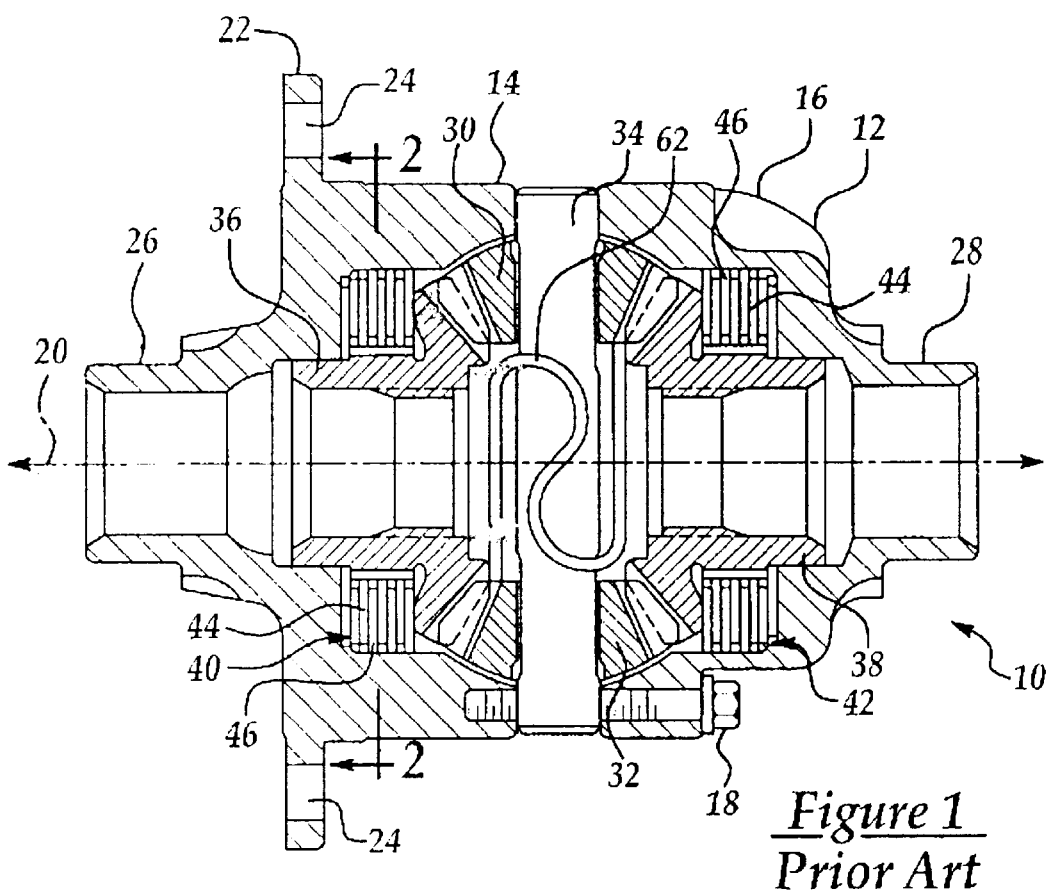
FIG. 1 is a sectional view of a conventional limited slip differential mechanism which is made in accordance with the teachings of the prior art.
Figure 2:
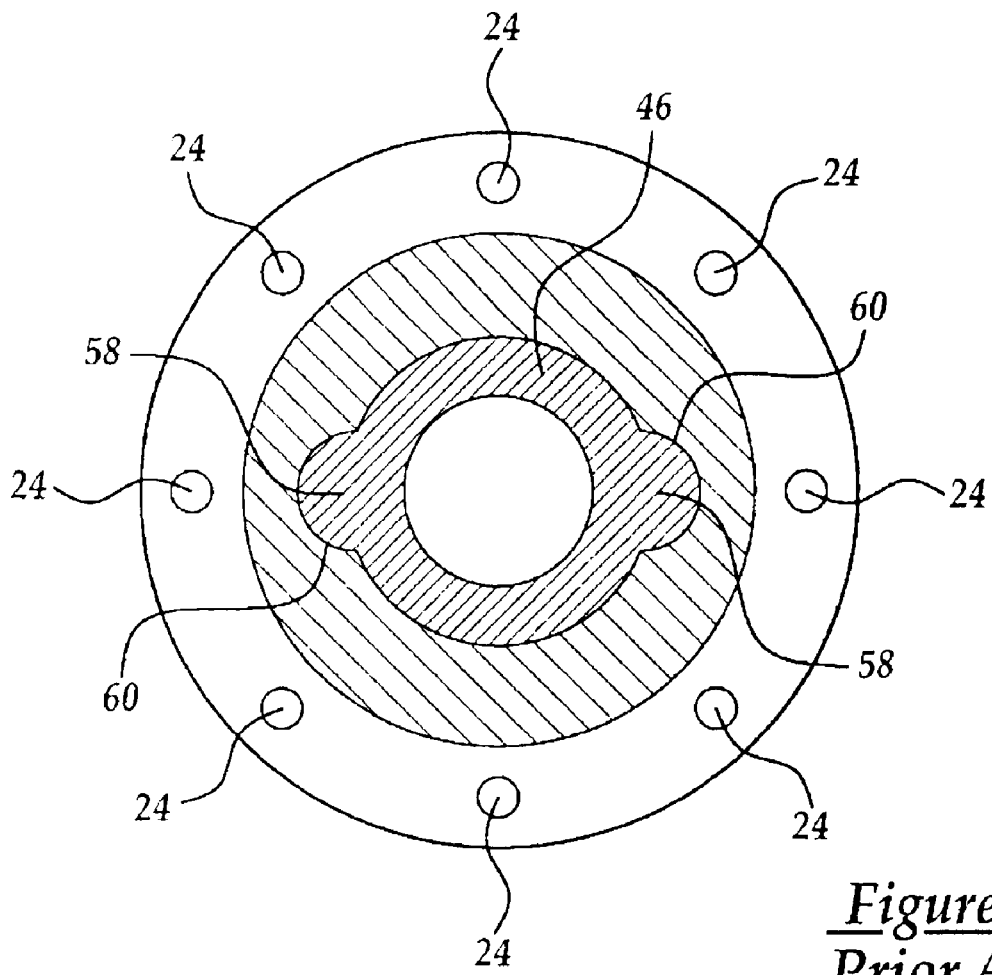
FIG. 2 is a sectional view of the limited differential mechanism shown in FIG. 1 taken along view line 2—2 and illustrating the mating between a clutch plate and the inner surface of the differential housing.

Referring now to FIGS. 1–2, there is shown a limited slip differential mechanism or assembly 10 which is made in accordance with the teachings of the prior art. Assembly 10 is adapted to be operatively mounted within an automotive vehicle, and to transfer torque to the right and left axles of the vehicle, (e.g., the right and left rear axles) while allowing the right and left axles of the vehicle to rotate at different speeds.

As best shown in FIG. 1, differential assembly 10 includes a one-piece housing 12 having a first side 14 and a second side 16. The assembly 10 is supported for rotation about a central axis 20. Housing portion 14 includes an orthogonally projecting flange 22 having several apertures 24 which are adapted to receive fasteners for coupling a ring gear (not shown) to the differential. Housing 12 is cast and subsequently, journals 26, 28 are machined and extend axially and provide a surface on which friction bearings are operatively disposed for rotatably supporting the assembly 10 about axis 20. Assembly 10 further includes two bevel pinions 30, 32 which are rotatably supported on a pinion shaft 34. Pinion shaft 34 is coupled to housing 12 by use of a conventional fastener 18. A pair of side bevel gears 36, 38 are in continuous meshing engagement with pinions 30, 32 and are each adapted for driveable connection to a rear axle shaft (not shown). The rear axle shafts (i.e., right and left rear axle shafts) extend outwardly from the differential housing 12 through bores located in each journal 26, 28.

A pair of clutch packs 40, 42 are disposed on each side of the pinion shaft 34. Clutch packs 40, 42 each include several clutch plates 44 (e.g., friction plates) which are coupled to side gears 36, 38 in a conventional manner (e.g., by a splined engagement), and several clutch plates 46 (e.g., pressure plates) which mate with the inner surface of housing 12. As shown best in FIG. 2, each of the clutch plates 46 includes a pair of tabs or ears 58 which cooperatively engage corresponding depressions 60 integrally formed or machined within the inner surface of the housing 12. One or more pre-load spring members 62 are disposed within differential assembly 10 and engage each of clutch packs 40, 42, effective to apply an initial force to each clutch pack 40, 42.

When the housing 12 is rotatably driven (e.g., through the ring gear), the pinion shaft 34 is rotated about central axis 20, thereby carrying pinions 30, 32 in rotation about the central axis 20. The rear axle shafts and side bevel gears 36, 38 are driven through engagement with the pinions 30, 32. Under normal driving conditions, the clutches 40, 42 slip, as the torque generated by the differential action easily overcomes the capacity of the clutches 40, 42. This allows for normal differential action when the vehicle is turning. During adverse road conditions, where one or both wheels may be on a low friction surface (e.g., snow, ice or mud), the friction between the clutch plates 44, 46 will transfer a portion of usable toque to the wheel with the most traction.

The pinions 30, 32, side gears 36, 38, and clutches 40, 42 are supported on the interior surface of the housing 12, which has a generally spherical contour, and the rear face of the pinions 30, 32 and side gears 36, 38 are shaped accordingly. Other portion of the side gears 36, 38 (i.e., portions extending toward journals 26, 28 are supported within pockets formed within the inner surface of the housing 12. As previously described, clutch plates 46 are supported on the interior surface of the housing 12 which has depressions 60 which conform with tabs 58. Since housing 12 is cast, machining the relatively complex interior surface of housing 12 undesirably increases the manufacturing complexity, cost and time. Additionally, over time the operation of differential mechanism 10 can result in wear between tabs 58 and depressions 60, thereby adversely effecting the performance of the differential mechanism.

Referring now to FIGS. 3–8, there is shown a limited slip differential mechanism or assembly 100 which is made in accordance with the teachings of the present invention. The differential mechanism includes a housing 102 having a first or an "upper" portion 104 and a second or "lower" portion 106. Portion 104 has a generally bell-shaped outer surface 108, and portion 106 has a generally bell-shaped outer surface 110. The outer annular surface 112 where upper portion 104 terminates is abuttingly engaged with and fixedly coupled to an adjacent annular surface 114 formed within the inner surface 116 of lower portion 106. In the preferred embodiment of the invention, surface 112 is permanently joined to surface 114 by use of a conventional laser welding procedure. The outer annular surface or flange 118 where lower portion 106 terminates is adapted to receive a conventional differential outer bevel or ring gear 120. In the preferred embodiment, the inner surface 122 of outer gear 120 is coupled to surface 118 by use of a conventional laser welding procedure.

Figure 3:
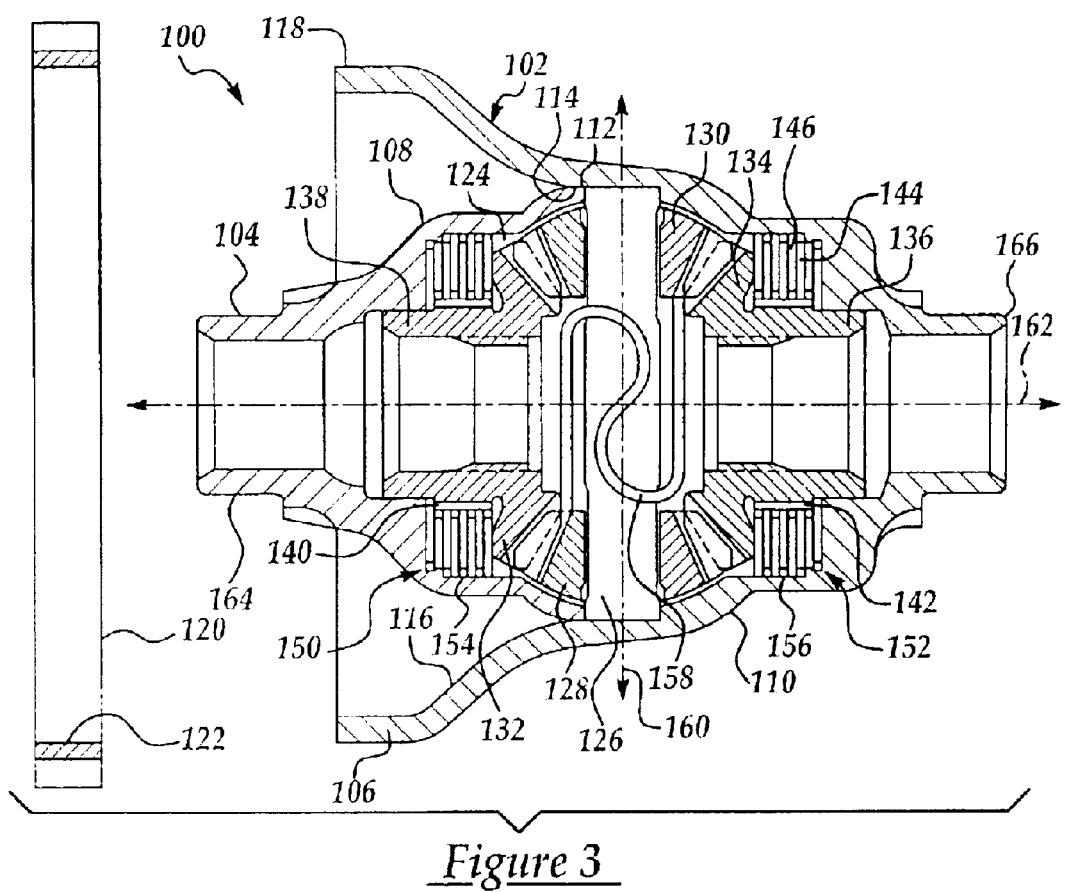
FIG. 3 is a sectional view of a limited slip differential mechanism which is made in accordance with the teaching of the preferred embodiment of the present invention.
Figure 4:
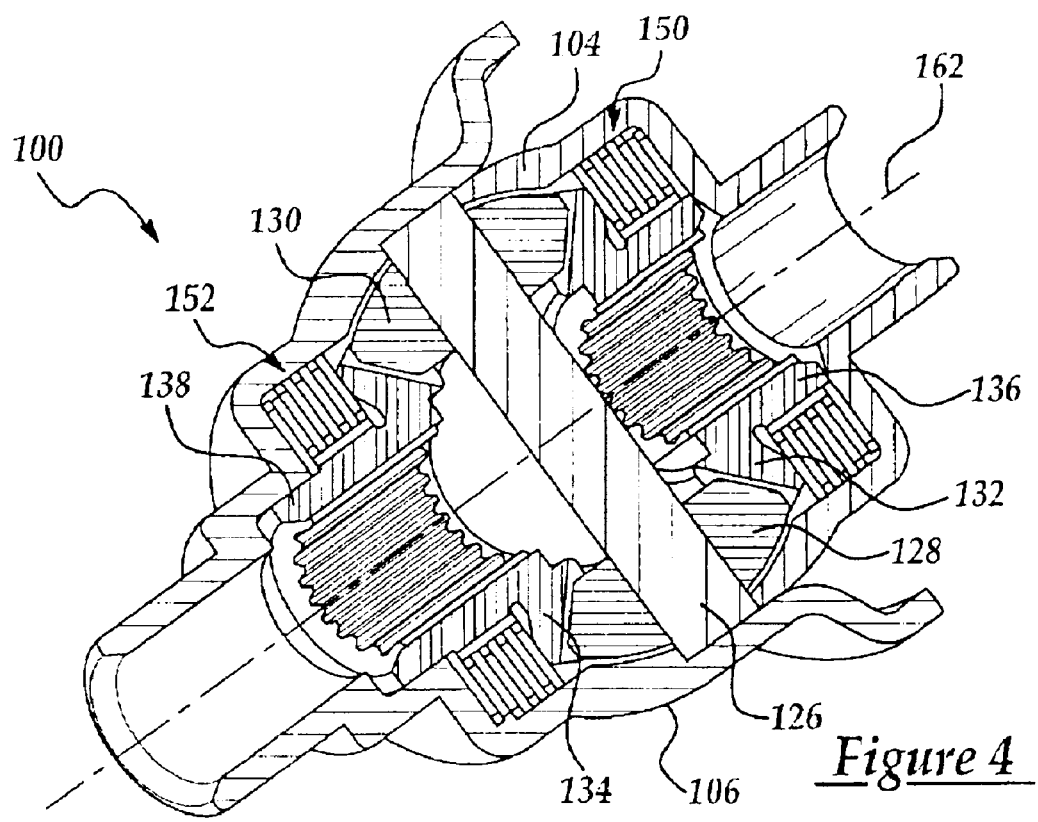
FIG. 4 is a perspective view of a cross section through a central plane of the differential mechanism shown in FIG. 3.

Housing portions 104 and 106 cooperatively form an inner cavity 124 which houses the inner components of differential mechanism 100. Cavity 124 contains pinion shaft 126, which rotatably supports bevel pinions 128, 130, side bevel gears 132, 134 which are in continual meshing engagement with pinions 128, 130, respectively, and side gear clutch packs 150, 152. Portions 104 and 106 are joined at the centerline or longitudinal axis 160 of the pinion 126. Portions 104, 106 each respectively includes semi-circular recesses 170, 172 which are adapted to cooperatively engage pinion shaft 126 and retain pinion shaft 126 in a stationary position relative to housing 102. As shown in FIG. 3, in the preferred embodiment, pinion shaft 126 is fully enclosed within housing 102, unlike the prior art design shown in FIG. 1. Portion 106 may also include lubrication holes 174 which may be pierced, drilled or laser cut entirely through the thickness of portion 106.

Each of side bevel gears 132, 134 includes respectively outwardly extending portions 136, 138 which are each adapted to be connected to a unique axle shaft in a conventional manner (e.g., by use of a splined engagement). Portions 136, 138 further respectively include an outer notched or splined surface 140, 142.

Figure 9A:
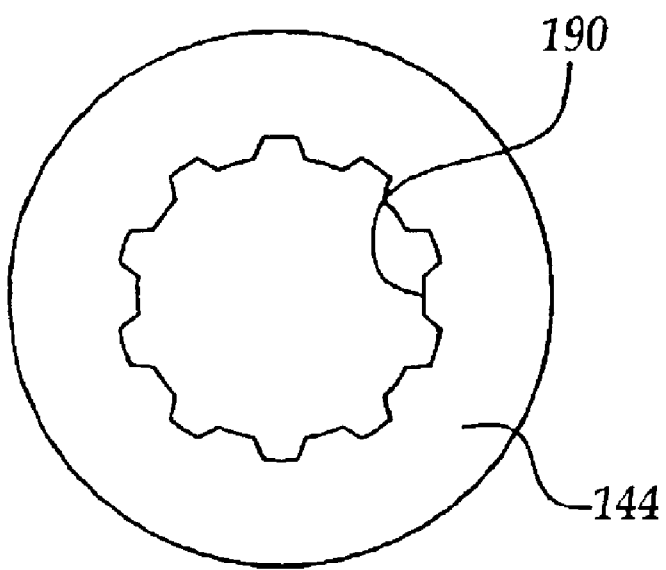
FIGS. 9a and 9b illustrate a pair of clutch plates which are used within the clutch packs employed within the preferred embodiment of the present invention.

Clutch packs 150, 152 each include several clutch plates 144 (e.g., friction plates) which are coupled to side bevel gears 132, 134 and several clutch plates 146 (e.g., steel or pressure plates) which are coupled to housing 102 (i.e., to portions 104 and 106 of housing 102). In the preferred embodiment, clutch plates 144 have a splined inner surface 190 (as shown in FIG. 9a) which intermeshingly engages with the outer splined surfaces 140, 142 of side gears 132, 134. It should be appreciated that in alternate embodiments, plates 144, 146 may interchangeably comprise pressure type plates and friction type plates, and/or any other types of conventional clutch plates.

Figure 9B:
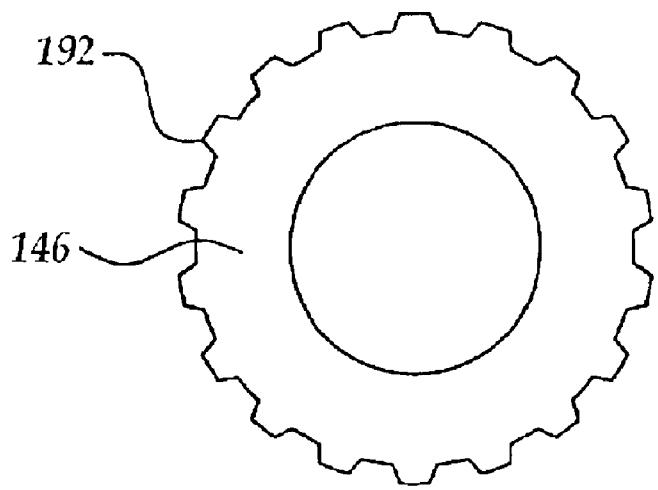

Importantly, each of portions 104 and 106 respectively includes an integrally formed notched or splined portion, surface or pocket 154, 156. Portions 154, 156 are each adapted to receive and operatively retain clutch plates 146. Particularly, each of the clutch plates 146 has an outer notched or splined surface 192 (as shown in FIG. 9b) which mates with notched or splined surfaces 154, 156, thereby fixedly securing plates 146 relative to housing portions 104, 106. This splined engagement between plates 146 and housing 102 provides significant advantages over the prior art tab configuration shown in FIG. 2. The engagement of the present invention provides a much more secure fit than the prior art tab arrangement, reduces and/or eliminates backlash and relative movement between the clutch plates 146 and housing 102, and increases the overall torque capacity of the differential mechanism 100.

In the preferred embodiment, one or more conventional pre-load springs 158 are disposed within cavity 124 and around pinion shaft 126, and pinions 128, 130. Springs 158 provide an initial force on each clutch pack 150, 152. In alternate embodiments, springs 158 may be replaced with other types of force providing mechanisms, such as hydraulic or pressurized fluid systems.

The longitudinal axis 160 of pinion shaft 126 is substantially perpendicular to the axis of rotation 162 of assembly 100. In alternate embodiments, where the magnitude of torque transferred through the differential is relatively high, additional pinions may be included. Such additional pinions would be supported on and spaced mutually about the central axis of the housing 102, and would intermesh with side gears 132, 134.

Housing portions 104, 106 each include respective journal portions 164, 166 on which assembly 100 may be supported for rotation about axis 162. Particularly, conventional bearings (not shown) may be fitted over journals 164, 166, thereby allowing assembly 100 to rotate about the axis 162.

In the preferred embodiment, upper housing portion 104 and lower housing portion 106 are formed by use of a conventional flow-forming or spin-forming process, such as the processes described within U.S. Pat. No. 6,045,479 of Victoria et al. and U.S. Pat. No. 6,176,152 of Victoria et al. which are both assigned to the present assignee and which are both fully and completely incorporated herein by reference. This flow or spin-forming process allows for splined portions or surfaces 154, 156 to be formed in a simple manner without requiring the inner surfaces of portions 104, 106 to be machined. Particularly, the process would be substantially identical to that described in the foregoing patents, and would use rotating chucks or mandrels having external splines. The pre-forms, which ultimately become portions 104, 106, are coupled to the rotating chucks or mandrels, and the external splines on the rotating chucks or mandrels form corresponding splined surfaces 154, 156 on the pre-forms. In this manner, splined surfaces 154, 156 can be formed without costly precision machining techniques. In alternate embodiments, different splined shapes or irregular surfaces can be formed on surfaces 154, 156 for supporting clutch plates 146, which will have a corresponding shape or irregular surface.

Figure 5:
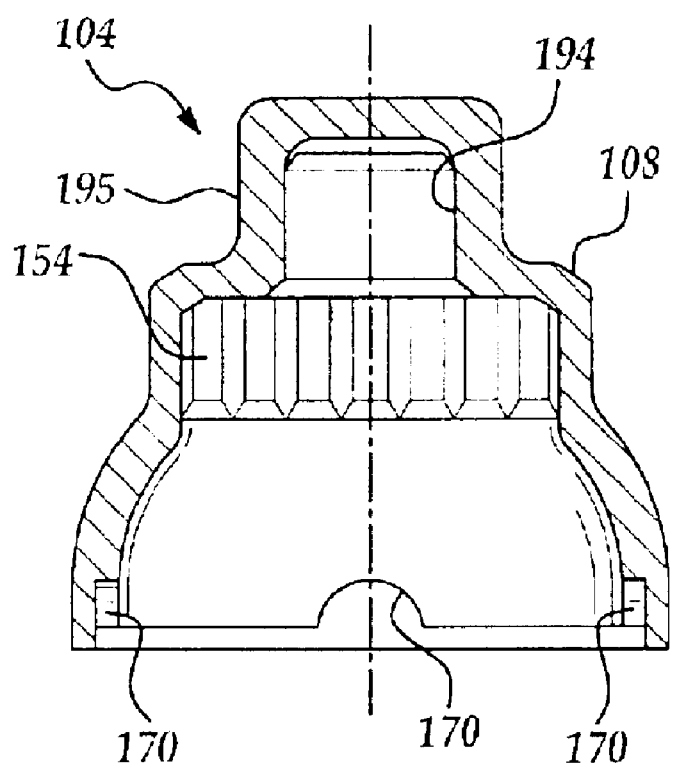
FIG. 5 is a cross section of the upper housing portion of the differential mechanism shown in FIG. 3 prior to post-forming machining.
Figure 6:
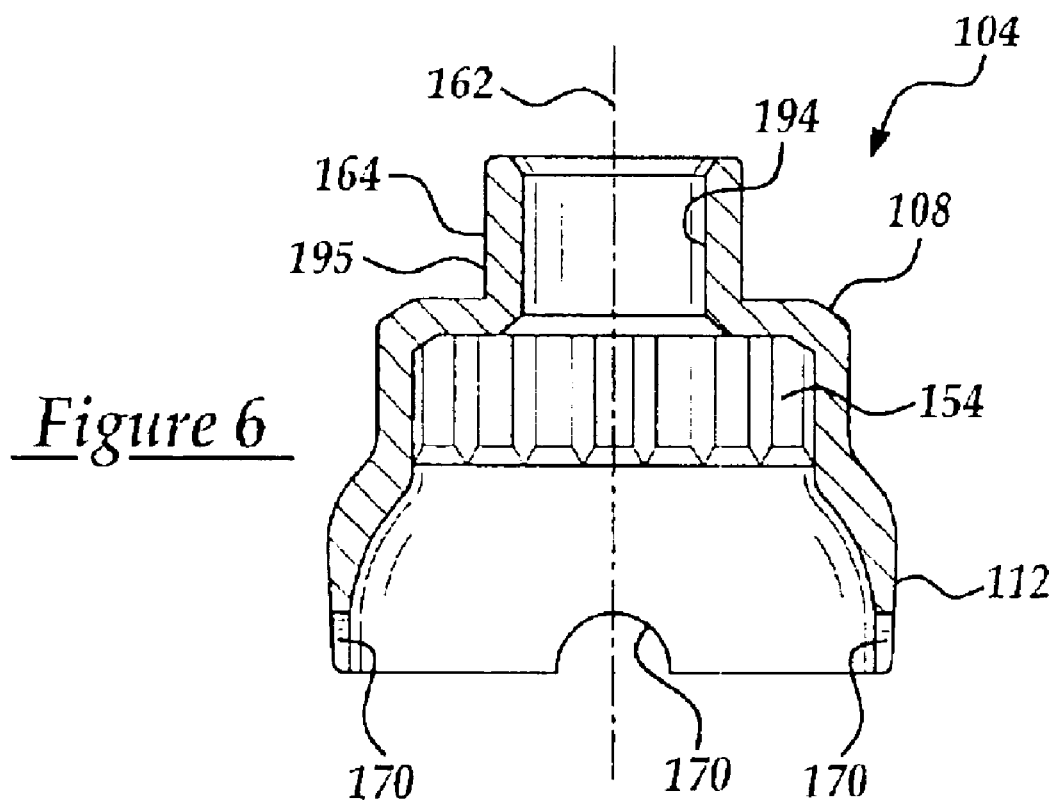
FIG. 6 is a cross section of the upper housing portion shown in FIG. 5 after post-forming machining.

FIG. 5 illustrates the upper housing portion 104 which has been flow formed or spin formed and which includes semi-circular recesses 170, splined surface 154, surface 194 which subsequently forms the inner surface of journal 164, and surface 195 which subsequently forms the outer surface of journal 164. FIG. 6 illustrates portion 104, after certain post-forming machining procedures have been performed on surfaces 194, 195 to form journal 164 and on outer surface 108 to form surface 112.

Figure 7:
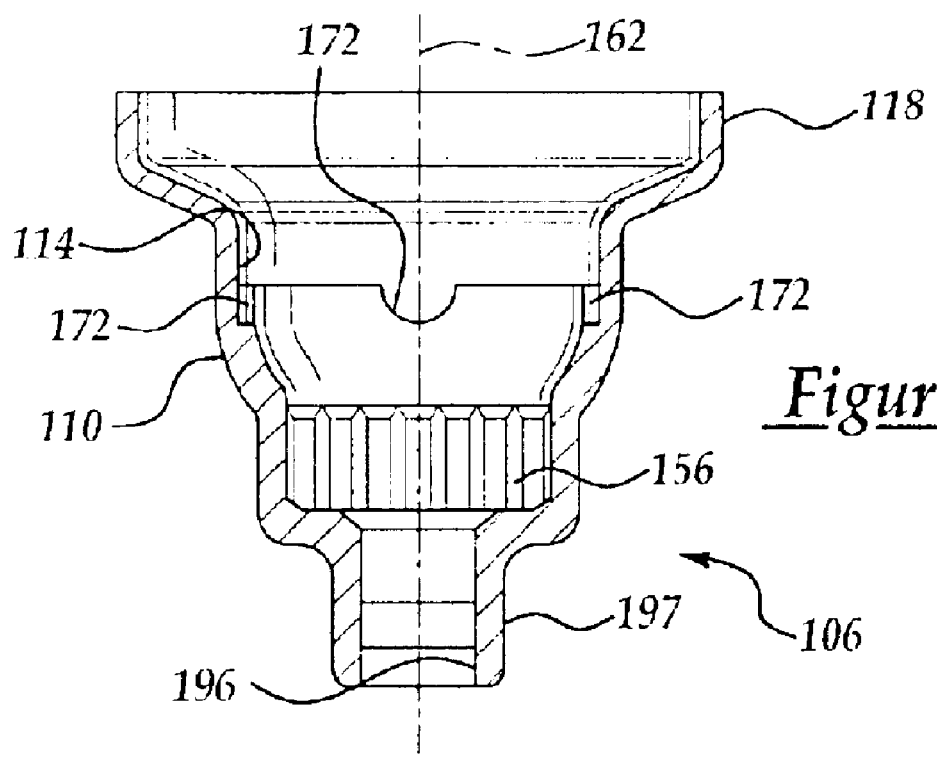
FIG. 7 is a cross section of the lower housing portion of the differential mechanism shown in FIG. 3 prior to post-forming machining.
Figure 8:
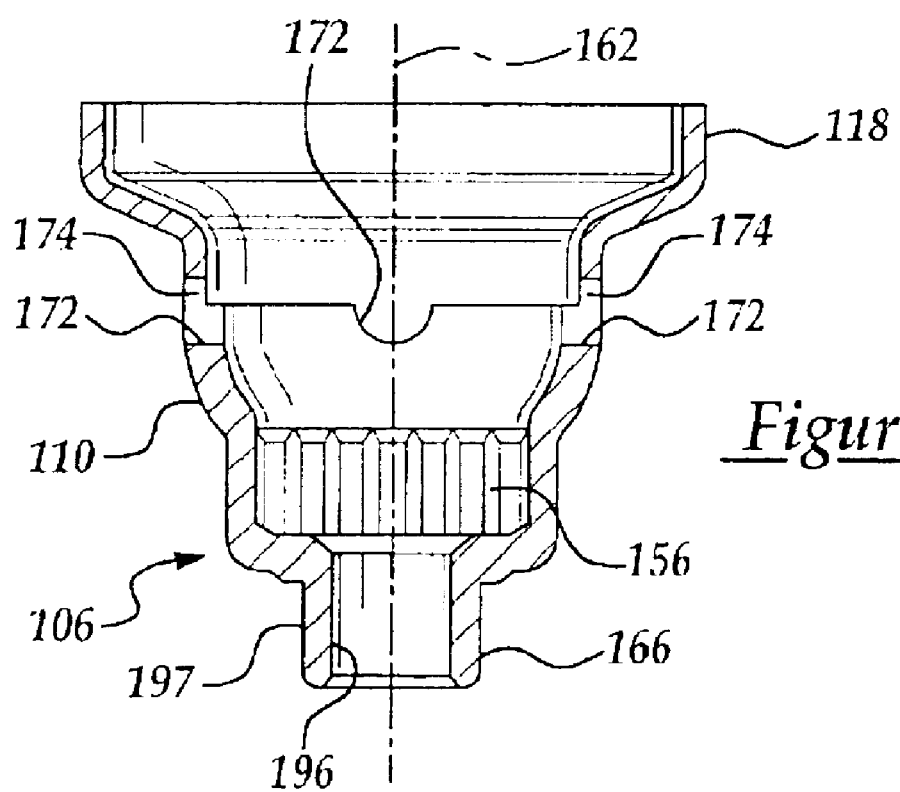
FIG. 8 is a cross section of the upper housing portion shown in FIG. 7 after post-forming machining.

FIG. 7 illustrates the lower housing portion 106 which has been flow-formed or spin-formed and which includes semi-circular recesses 172, splined surface 156, surface 196 which subsequently forms the inner surface of journal 166, and surface 197 which subsequently forms the outer surface of journal 166. FIG. 8 illustrates portion 106, after certain post-forming machining procedures have been performed on surfaces 196, 197 to form journal 166, on outer surface 110 to form surface 118, and apertures 174 are pierced.

In one non-limiting embodiment, limited slip differential mechanism 100 may be assembled as follows. Outer gear 120 is pressed onto surface 118 of lower housing portion 106. Clutch pack 152 is positioned into housing portion 106 with splined surfaces 192 mating with splined surface 156 and with plates 144 and 146 placed in an alternating sequence. Side gear 134 is then installed into the lower housing portion 106, with the outer splines 142 of side gear 134 mating with splines 190 of clutch plates 144. Springs 158 are placed around pinion shaft 126 and then shaft 126 and pinions 128, 130 and that subassembly is installed into portion 106 with its axial ends residing within grooves 172. The upper housing 104 is then assembled in a similar manner. Clutch pack 150 is installed into upper housing portion 104 with the splined surfaces 192 of clutch plates 146 mating with splined surface 154 and with clutch plates 144 and 146 placed in an alternating sequence. Side gear 132 is then installed into the upper housing portion 104, with the outer splines 140 of side gear 132 mating with splines 190 of clutch plates 144.

The upper housing 104 is then inserted into the lower housing 106 until the pinion groove 170 mates with the pinion shaft 126, thereby locking the pinion shaft 126 into place. The seam of the upper and lower housings 104, 106 (i.e., surfaces 112, 114) are then laser welded together, and outer gear 120 is laser welded to surface 118. This attachment method provides for a much simpler assembly since it eliminates the need for bolts or other fasteners which were required to attach the ring gears of prior differentials to their respective housings, and further eliminates the need for machining the housings and ring gears to be cooperatively aligned and to accept or receive such bolts or fasteners. After laser welding the outer gear to the surface 118, bearings and other accessories may be attached, along with axle shafts (not shown), which are mated with side gears 132, 134.

Differential assembly 100 offers significant advantages over prior art limited slip differential assemblies. For example and without limitation, assembly 100 includes a flow-formed housing 102 which has improved strength while retaining a relatively thin wall thickness, thereby allowing for a larger clutch pack to be utilized within the housing 102. Furthermore, the flow-forming procedure simplifies and reduces the cost of the assembly 100 relative to prior differential assemblies, and the fully enclosed pinion design eliminates pinion retaining bolts, snap rings, and other components. Moreover, the unique splined inner surfaces 154, 156 allow for improved clutch performance and durability. The enclosed transfer case design further provides improved stiffness relative to prior cast designs, and simplifies the assembly procedure and reduces cost.

It should be understood that this invention is not to be limited to the exact construction or embodiment described above but that various changes may be made without departing from the spirit or scope of the invention.

What is claimed is:

1. A limited slip differential assembly comprising:
   a first housing portion having a first splined inner surface;
   a second housing portion having a second splined inner surface, the second housing portion being coupled to the first housing portion and cooperating with the first housing portion to form a cavity;
   a differential mechanism disposed within said cavity and including a pinion shaft, pinions which are coupled to said pinion shaft, a first gear member in meshing engagement with a first of said pinions, and a second gear member in meshing engagement with a second of said pinions;
   a first side clutch pack including a plurality of first clutch plates having a first splined outer surface which is coupled to said first splined inner surface, and a plurality of second clutch plates which are coupled to said first gear member; and
   a second side clutch pack including a plurality of third clutch plates having a second splined outer surface which is coupled to said second splined inner surface, and a plurality of fourth clutch plates which are coupled to said second gear member.

2. The limited slip differential assembly of claim 1 further comprising an outer gear which is fixedly coupled to a unique one of said first and second housing portions.

3. The limited slip differential assembly of claim 2 further comprising a spring member which is disposed within said cavity and which engages said first and said second side clutch packs, effective to provide an initial force to said first and said second side clutch packs.

4. The limited slip differential assembly of claim 1 wherein said first splined inner surface and said second splined inner surface are respectively and integrally formed within said first and second housing portions.

5. The limited slip differential assembly of claim 4 wherein said first and second housing portions are formed by use of a spin-forming process.

6. The limited slip differential assembly of claim 4 wherein said first and second housing portions are formed by use of a flow-forming process.

7. The limited slip differential assembly of claim 1 wherein said pinion shaft is fully enclosed within said first and second housing portions.

8. The limited slip differential assembly of claim 1 wherein said first housing portion is laser welded to said second housing portion.

9. A limited slip differential mechanism comprising:
   a housing which is rotatably supported about a first axis, said housing including a first portion having a first notched inner surface, a second portion having a second notched inner surface and which is fixedly coupled to said first portion and which cooperates with said first portion to form an inner cavity, and an outer flange;
   an outer gear which is coupled to said outer flange;
   a pinion shaft which is fixedly disposed within said inner cavity;
   at least one first pinion which is supported on said pinion shaft;
   at least one second pinion which is supported on said pinion shaft;
   a first side gear which is engaged by said at least one first pinion;
   a second side gear which is engaged by said at least one second pinion;
   a first clutch pack including a plurality of first clutch plates, each having a first notched outer surface which mates with said first notched inner surface, and a plurality of second clutch plates, which are coupled to said first side gear, and which are disposed in an alternating relationship with said plurality of first clutch plates;
   a second clutch pack including a plurality of third clutch plates, each having a second notched outer surface which mates with said second notched inner surface, and a plurality of fourth clutch plates, which are coupled to said second side gear, and which are disposed in an alternating relationship with said plurality third clutch plates; and
   at least one spring member which is disposed within said inner cavity and which selectively engages said first and second clutch packs, effective to impart an initial force on said first and second clutch packs.

10. The limited slip differential mechanism of claim 9 wherein said pinion shaft is contained between semi-circular grooves which are integrally formed within said first and second portions of said housing.

11. The limited slip differential mechanism of claim 9 wherein said first and second portions of said housing include integrally formed bearing journals on which said housing is rotatably supported.

12. The limited slip differential mechanism of claim 9 wherein said first and second side gears each comprises a bevel gear and is adapted to be connected to a unique axle shaft.

13. A method of forming a housing for a limited slip differential mechanism comprising the steps of:
   forming a first housing portion having a first splined inner surface; and
   forming a second housing portion having a second splined inner surface, said first and second inner surfaces being effective to respectively mate with and operatively retain a plurality of first and second clutch plates.

14. The method of claim 13 further comprising the steps of:

provautomatically a first clutch pack including said plurality of first clutch plates and further including a plurality of third clutch plates;

providing a second clutch pack including said plurality of second clutch plates and further including a plurality of fourth clutch plates;

disposing said first clutch pack within said first housing portion;

installing a first side gear, pinion shaft, pinions and a pre-load spring into said first housing portion;

disposing said second clutch pack within said first housing portion;

installing a second side gear into said second housing portion; and connecting said first and second housing portions.

15. The method of claim 13 wherein said first and second housing portions are formed by use of a flow-forming process.

16. The method of claim 13 wherein said first and second housing portions are formed by use of a spin-forming process.

17. The method of claim 14 further comprising the steps of:

forming an outer flange on said first housing portion;

pressing an outer gear to said flange; and laser welding said outer gear to said flange.

18. The method of claim 14 wherein said first housing portion and said second housing portion are connected by use of a laser welding procedure.

19. The method of claim 14 further comprising the steps of:

forming first semi-circular recesses within said first housing portion; and forming second semi-circular recesses within said second housing portion, said first and second semi-circular recesses being effective to mate with and secure said pinion shaft within said limited slip differential mechanism when said first housing portion is connected to said second housing portion.

* * * * *